(12) United States Patent
Votra

(10) Patent No.: US 8,603,604 B1
(45) Date of Patent: Dec. 10, 2013

(54) ONE-PIECE ENCAPSULATED PLASTIC PRODUCT FORMED FROM MULTIPLE RECYCLED PRODUCTS

(76) Inventor: Timothy Votra, Marathon, NY (US)

( * ) Notice: Subject to any disclaimer, the term of this patent is extended or adjusted under 35 U.S.C. 154(b) by 74 days.

(21) Appl. No.: 12/758,209

(22) Filed: Apr. 12, 2010

(51) Int. Cl.
*B32B 1/04* (2006.01)
*B32B 3/02* (2006.01)

(52) U.S. Cl.
USPC .............................................. 428/76; 428/68

(58) Field of Classification Search
USPC ....................................... 428/76, 68
See application file for complete search history.

(56) References Cited

U.S. PATENT DOCUMENTS

| | | | |
|---|---|---|---|
| 3,179,637 A | | 4/1965 | Brodt |
| 3,635,483 A | * | 1/1972 | Barriball et al. .............. 280/610 |
| 3,647,279 A | * | 3/1972 | Sharpless et al. ............... 349/23 |
| 4,986,699 A | * | 1/1991 | Bohnhoff ........................ 405/50 |
| 5,319,522 A | | 6/1994 | Mehta |
| 5,732,364 A | | 3/1998 | Kalb |
| 2006/0058764 A1 | * | 3/2006 | Bohlen et al. ............ 604/385.02 |

* cited by examiner

*Primary Examiner* — Brent O'Hern
(74) *Attorney, Agent, or Firm* — Mark Levy; Hinman, Howard & Kattell, LLP

(57) ABSTRACT

Disclosed is a one-piece, encapsulated, plastic product formed by a single extrusion operation using many different materials so a first portion of the article is made of one material, and the other portions of the article, encapsulated by the first portion, are made of many different other materials. The portions are fused together while hot, to create a one-piece article, preferably in the approximate shape of a peanut. The one-piece plastic products are manufactured by using an underwater pelletizing system. Different various materials, such as plastics, paper, wood fibers, metals, and glass are fed into the pelletizer system using process water as its transporter. Examples of use for the one-piece, encapsulated product are in landfill drainage and ventilation, septic drainage aggregate, concrete reinforcement aggregate, playground safety surfaces, preschool play material, manufacturing parts separator, chemical scrubbers, drag strips, truck and airport run off areas, and backing material for safety walls.

3 Claims, 2 Drawing Sheets

ONE-PIECE ENCAPSULATED PLASTIC PRODUCT FORMED FROM MULTIPLE RECYCLED PRODUCTS

FIELD OF INVENTION

The present invention relates to encapsulated plastic products, and more particularly, to a one-piece plastic product formed from a single extrusion operation using many different materials where the portions are fused together through heat.

BACKGROUND OF THE INVENTION

The plastic industry is the third largest manufacturing industry in the United States. Due to their relatively low cost, ease of manufacture, versatility, and imperviousness to water, plastics are used in an enormous and expanding range of products. Plastics have already displaced many traditional materials, such as wood; stone; horn and bone; leather; paper; metal; glass; and ceramic, in most of their former uses. However, many full landfills and contaminated waters are filled with various products that are displaced, as well as plastics themselves.

For this reason, it is useful to develop a method where multiple articles can be recycled and reused to create a useable, one-piece, encapsulated plastic product. This has several advantages including the fact that the process can eliminate some of the plastics and other articles being dumped into the landfills. This allows recycling of various items such as plastics, paper, wood fibers, metals, and glass into a plastic product that can be used while also keeping the public's ground water safe. No prior art appears to deal with a method to recycle multiple materials into a one-piece plastic product using harmless materials such as those mentioned above. Certain existing patents deal with the process of encapsulation itself, but not encapsulating already existing materials into a one-piece plastic product. Another patent does deal with encapsulating harmful materials such as hazardous waste in order to help with the disposal. However, the present invention uses materials such as plastics, paper, wood fibers, metals, and glass and encapsulates them into a plastic one-piece article for use in other items. No published patent applications were found.

U.S. Pat. No. 5,319,522 for ENCAPSULATED PRODUCT AND METHOD OF MANUFACTURE issued Jun. 7, 1994 to Ford Motor Company discloses a method for encapsulating an object with a heat-shrinkable material prior to subjecting the encapsulated object to insert, injection molding. The encapsulation protects the object from thermal damage by preventing contact with the injected polymer. In addition, the encapsulation protects the object from contact by any liquids or other foreign materials which penetrate the molded enclosure.

U.S. Pat. No. 3,179,637 for POLYETHYLENE ENCAPSULATED PRODUCT AND METHOD OF MAKING THE SAME issued Apr. 20, 1965 to Barton P. Brodt discloses a process for the encapsulation of chemical compounds. More particularly, the invention relates to the preparation of delayed-action elastomer processing agents and their compositions.

U.S. Pat. No. 5,732,364 for COMPOSITION AND PROCESS FOR THE ENCAPSULATION AND STABILIZATION OF RADIOACTIVE, HAZARDOUS AND MIXED WASTES issued Mar. 24, 1998 to Paul D. Kalb discloses a composition and process for disposal of radioactive, hazardous and mixed wastes. It preferably includes a process for multibarrier encapsulation of wastes by combining substantially simultaneously dry waste power, a non-biodegradable thermoplastic polymer and an anhydrous additive in an extruder to form a homogenous molten matrix.

The patents listed above deal with either a general form of encapsulation or encapsulation of hazardous or mixed wastes. The patents do not focus on encapsulating materials such as plastics, paper, wood fibers, metals, and glass into a one-piece plastic product for use in other items.

Due to the fact that landfills are full of up to 50% plastics, as well as paper, wood fibers, metals, and glass, it is useful to have a method to re-use these items to form a durable one-piece plastic product, rather than forming a plastic product from scratch.

SUMMARY OF THE INVENTION

Disclosed is a one-piece, encapsulated, plastic product made using a single extrusion operation using many different materials so a first portion of the article is made of one material, and the other portions of the article are made of many different materials, optionally including plastics. The portions are fused together while hot, creating a one-piece article. Landscape rocks, bricks, blocks, etc., may also be poured into molds using the same extrusion process.

The one-piece, plastic products are manufactured by using an underwater pelletizing system which is well known. Methane gas, a by-product of landfills, power electrical generators that may be used to run the underwater pelletizer lights, ventilation, and the pelletizer itself. Different materials are fed into an extruder, which forces the molten polymer through a screen changer and/or polymer diverter, then through the pelletizer die plate. As the polymer emerges from the die, a one-piece, plastic product emerges and is solidified by process water which flows across the die face. The process water transports the one-piece plastic product to a centrifugal dryer where the water is removed and the products are discharged.

The one-piece, encapsulated, plastic product may be formed into many different shapes or sizes. It may be used in landfill leachate drainage and ventilation, commercial and residential septic system drainage aggregate, concrete reinforcement aggregate, playground safety surfaces, preschool play material, manufacturing parts separator, chemical scrubbers, drag strips, truck and airport run off areas, or as a backing material for highway and racing safety walls. In fact, the one-piece product can also advantageously replace gravel and clay in landfills themselves.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

For a better understanding of the present invention, together with other and further objects, advantages, and capabilities thereof, reference is made to the following disclosure and appended claims in connection with the above-described drawings. The present invention is further described with reference to the accompanying figures where like reference numbers correspond to the same elements.

Figure 1:
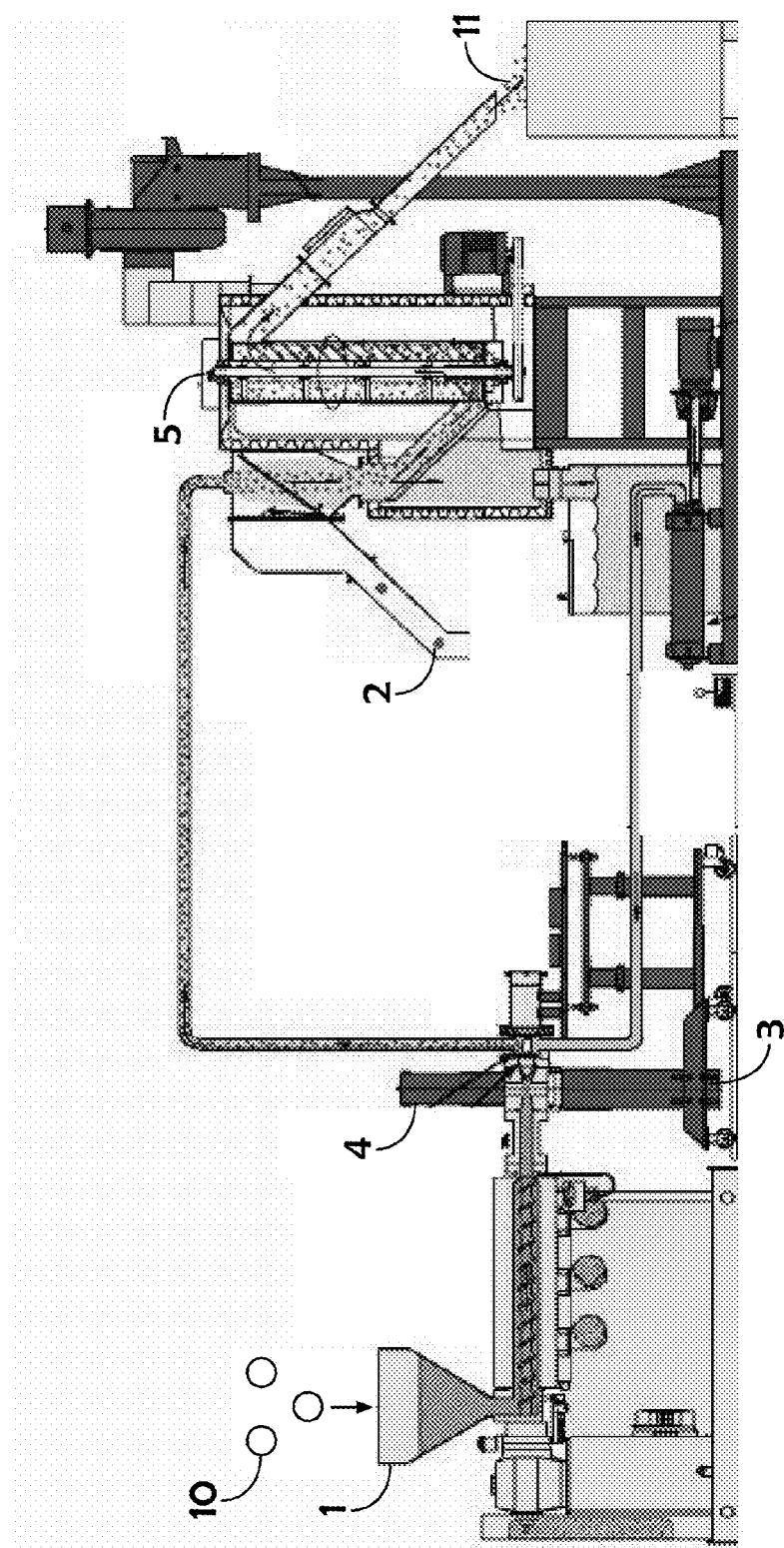
FIG. 1 is a process schematic that shows the flow of the multiple plastic materials through the system in order to form the one-piece plastic product in accordance with the invention.

FIG. 1 is a process schematic that shows the flow of material through an underwater pelletizing system to from the one-piece plastic product. Different materials 10, including but not limited to suitably ground or chopped plastics, paper, wood fibers, metals, and glass, are fed into an extruder 1, which forces the molten polymer 2 (not shown) through a polymer diverter 3, then through a pelletizer die plate 4. As the polymer 2 (not shown) emerges from the die plate 4, a one-piece plastic product emerges 11 (not shown) and is solidified by process water which flows across the face of the die plate 4. The process water transports the polymer 2 which is now a one-piece plastic product 11 (not shown) to a centrifugal dryer 5. The water is removed and the products 11 are discharged.

Figure 2A:
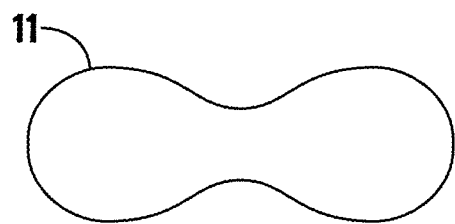
FIG. 2a is a view of a one-piece product formed by a pelletizer.

FIG. 2a shows the preferred embodiment of the one-piece product 11 extruded from extruder 1 (FIG. 1).

Figure 2B:
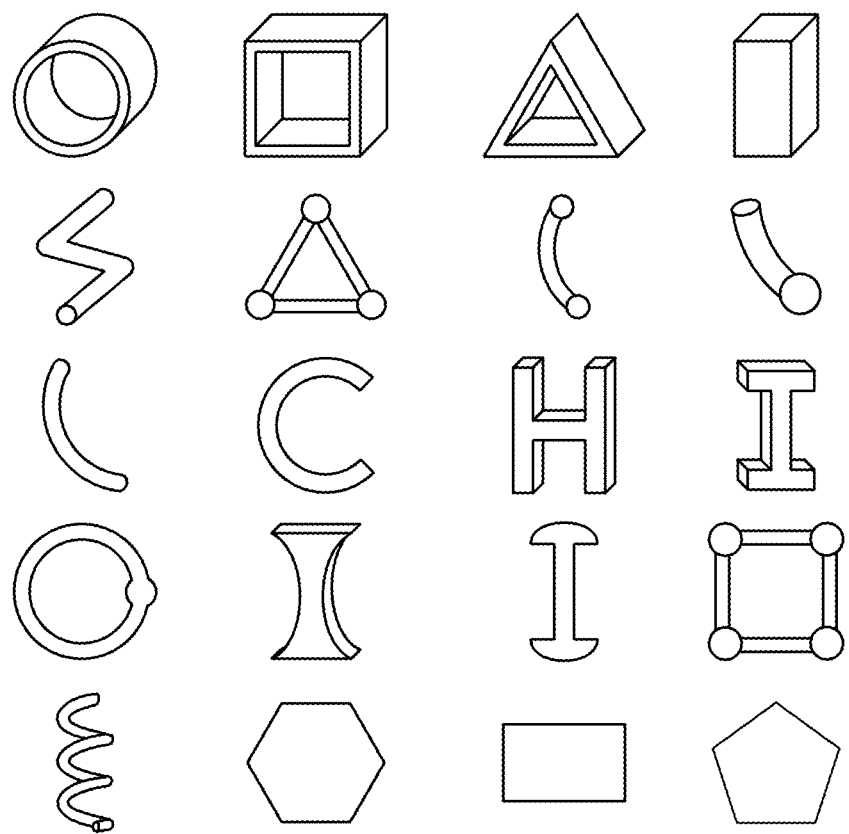
FIG. 2b is a depiction of alternative embodiments of the one-piece, encapsulated, plastic product.

FIG. 2b is a representation of examples of alternative embodiments of the one-piece plastic product. The shapes and sizes of the product can vary and may include different numbers, letters, straight or spiral shapes. The thickness can vary as well.

Since other combinations, modifications and changes varied to fit particular operating requirements and environments will be apparent to those skilled in the art, the invention is not considered limited to the chosen preferred embodiments for purposes of this disclosure, but covers all changes and modifications which do not constitute departures from the true spirit and scope of this invention.

Having thus described the invention, what is desired to be protected by Letters Patent is presented in the subsequently appended claims.

What is claimed is:

1. An encapsulated one-piece, peanut-shaped, plastic product, comprising:
   a first portion of the product comprising polymer plastic; and
   various other portions of the product encapsulated by said first portion thereof, said first portion being fused to said other portions while all of said portions are sufficiently hot to melt said polymer plastic by means of an underwater pelletizer machine forming a one-piece peanut-shaped product by extrusion.

2. The encapsulated one-piece, peanut-shaped, plastic product of claim 1, wherein said various other portions comprise other materials.

3. The encapsulated one-piece, peanut-shaped, plastic product of claim 2, wherein said materials of said various other portions, contain at least one of the group: plastics, paper, wood fibers, metals and glass.

* * * * *